US010776238B2

(12) United States Patent
Boss et al.

(10) Patent No.: US 10,776,238 B2
(45) Date of Patent: Sep. 15, 2020

(54) RESOLVING APPLICATION MULTITASKING DEGRADATION

(71) Applicant: INTERNATIONAL BUSINESS MACHINES CORPORATION, Armonk, NY (US)

(72) Inventors: Gregory J. Boss, Saginaw, MI (US); Christopher J. Dawson, Arlington, VA (US); Rick A. Hamilton, II, Charlottesville, VA (US); Ninad D. Sathaye, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/205,455

(22) Filed: Nov. 30, 2018

(65) Prior Publication Data

US 2019/0102273 A1    Apr. 4, 2019

Related U.S. Application Data

(63) Continuation of application No. 15/235,270, filed on Aug. 12, 2016, now Pat. No. 10,223,228.

(51) Int. Cl.
*G06F 9/50* (2006.01)
*G06F 11/30* (2006.01)
*G06F 11/34* (2006.01)

(52) U.S. Cl.
CPC ........ *G06F 11/3024* (2013.01); *G06F 9/5083* (2013.01); *G06F 11/3409* (2013.01)

(58) Field of Classification Search
CPC .................................................. G06F 9/5083
See application file for complete search history.

(56) References Cited

U.S. PATENT DOCUMENTS 5,075,675 A    12/1991  Barker et al.
5,490,272 A     2/1996  Mathis et al.
(Continued)

FOREIGN PATENT DOCUMENTS

EP    2682850    1/2014

OTHER PUBLICATIONS

List of IBM Patents or Patent Applications Treated as Related, dated Nov. 29, 2018, 1 page.

*Primary Examiner* — Charlie Sun
(74) *Attorney, Agent, or Firm* — William Hartwell; Andrew D. Wright; Roberts, Calderon, Safran & Cole, P.C.

(57) ABSTRACT

Systems and methods for resolving application multitasking degradation are disclosed. In aspects, a computer implemented method is used with a user device including a multitasking operating system, shared user device resources, a first application and a second application. The method includes: running, simultaneously, the first application and the second application; measuring performance parameters for one or more application tasks of the first and second applications; and determining that one or more of the performance parameters of the one or more application tasks falls below a performance threshold value of an associated key performance indicator (KPI). The determination indicates degradation in performance of at least one of the first application and second application. The method further includes instructing the operating system to modify an allocation of the shared user device resources to address the degradation in performance of the at least one of the first application and second application.

18 Claims, 4 Drawing Sheets

(56) References Cited

U.S. PATENT DOCUMENTS

| | | | |
|---|---|---|---|
| 5,903,752 | A | 5/1999 | Dingwall et al. |
| 6,601,083 | B1 | 7/2003 | Reznak |
| 7,536,689 | B2 | 5/2009 | Mangan |
| 8,549,525 | B2 | 10/2013 | Hung et al. |
| 9,104,416 | B2 | 8/2015 | Eastlack |
| 2008/0022285 | A1 | 1/2008 | Cherkasova et al. |
| 2011/0252429 | A1 | 10/2011 | Ballard et al. |
| 2015/0193061 | A1 | 7/2015 | Stekkelpak et al. |
| 2015/0347179 | A1 | 12/2015 | Barraclough et al. |
| 2017/0192741 | A1 | 7/2017 | Liu et al. |
| 2018/0046510 | A1 | 2/2018 | Boss et al. |

RESOLVING APPLICATION MULTITASKING DEGRADATION

BACKGROUND

The present invention relates generally to computer-based application multitasking and, more particularly, to methods and systems for addressing application multitasking degradation.

An application program (app) requires one or more application processes or tasks (hereafter referred to as application tasks) to be performed. A user may experience lag or slowdown in one or more applications when multitasking application tasks on a computer device. This may occur when one or more application tasks consume too many shared resources, and application tasks become "starved", resulting in inefficient execution of the application tasks. The user is often unaware of which background application tasks are impacting this slowdown. Often, simply being aware of what is happening with the processing of applications on a device will alleviate user frustrations, but users typically have little patience when an interface simply presents an icon of a rotating clock to indicate a processing slowdown. Today, the types of multitasking most commonly employed are preemptive and cooperative; but neither of these solves the slowdown problem mentioned above. Additionally, process priorities can be automatically assigned to a foreground application; however, such methodology does not allow for efficient multitasking.

In general, methods exist for adjusting performance of multitasking systems. By way of example, U.S. Pat. No. 8,549,525 is directed to a "METHOD FOR TUNING SERVICE PERFORMANCE OF MULTI-TASK SYSTEM AND MULTI-TASK SYSTEM THEREOF." The '525 patent addresses the problem of multi-tasking in systems with limited processing power by running a higher priority task for a first duration, and suspending the high priority task to preserve system resources before executing a lower priority task for a second duration. The '525 patent represents a resource allocation solution that is purely based on mathematical algorithms using set application priorities. Such solutions are not responsive to the manner in which a user is interacting with one or more applications on a device, and do not provide dynamic prioritization of applications to provide for an optimal user experience. Moreover, such solutions do not address the visibility of the multitasking applications to a user.

In another example, U.S. Pat. No. 7,536,689 is directed to a "METHOD AND SYSTEM FOR OPTIMIZING THREAD SCHEDULING USING QUALITY OBJECTIVES". The '689 patent teaches providing "a scheduling algorithm that periodically adjusts scheduling parameters of tasks based on comparison of resource usage against desired resource limitations". Such solutions are not responsive to the manner in which a user is interacting with one or more applications on a device, and do not provide dynamic prioritization of applications based on the visibility of the applications to a user.

SUMMARY

In an aspect of the invention, a computer-implemented method includes: running, simultaneously, the first application and the second application; measuring performance parameters for one or more application tasks of the first and second applications; and determining that one or more of the performance parameters of the one or more application tasks falls below a performance threshold value of an associated Key performance indicator (KPI). The determination indicates degradation in performance of at least one of the first application and second application. The method further includes instructing the operating system to modify an allocation of the shared user device resources to address the degradation in performance of the at least one of the first application and second application.

In embodiments, the computer-implemented method may include determining baseline performance parameters for the one or more application tasks of the first application and the second application; creating the KPIs for the one or more applications tasks based on the baseline performance parameters, wherein the KPIs comprise the performance threshold value for each of the one or more application tasks; and saving the KPIs in a database. Such methods enable a computer device to set its own threshold values consistent with the type of operating system of the device.

In embodiments, the computer-implemented method may include detecting a change in application focus on the user device; and assigning a first priority to the first application and a second priority to the second application; wherein the instructing the operating system to modify the allocation of the shared user device resources comprises instructing the operating system to prioritize the allocation of the shared user device resources to the first application over the allocation of the shared user device resources to the second application. Such methods enable a computer device to dynamically prioritize applications based on a user's interaction with the device, to provide for an optimal user experience.

In another aspect of the invention, there is a computer program product for resolving application multitasking degradation. The computer program product comprises a computer readable storage medium having program instructions embodied therewith. The program instructions are executable by a computing device to cause the computing device to: run, simultaneously, a first application and a second application on a multitasking operating system; measure performance parameters for one or more application tasks of the first application and the second application; and determine that one or more of the performance parameters of the one or more application tasks falls below a performance threshold value of an associated key performance indicator (KPI). The determination indicates degradation in performance of at least one of the first application and second application. The program instructions further cause the computing device to instruct the multitasking operating system to modify an allocation of shared computing device resources to address the degradation in performance of the at least one of the first application and second application.

In aspects, the program instructions may further cause the computing device to determine baseline performance parameters for the one or more application tasks of the first application and the second application; create the KPIs for the one or more application tasks of the first application and the second application based on the baseline performance parameters; and save the KPIs in a database. Such program instructions enable the computing device to set its own threshold values consistent with the type of operating system of the device.

In aspects, the program instructions may further cause the computing device to detect a change in application focus on the computing device; and assign a first priority to the first application and a second priority to the second application. In this embodiment, the step of instructing the operating system to modify the allocation of the shared user device resources comprises instructing the operating system to prioritize the allocation of the shared user device resources to the first application over the allocation of the shared user device resources to the second application. Such program instructions enable a computer device to dynamically prioritize applications based on a user's interaction with the device, to provide for an optimal user experience.

In another aspect of the invention, there is a system for resolving application multitasking degradation on a computing device having a multitasking operating system. The system includes a CPU, a computer readable memory and a computer readable storage medium associated with the computing device. The system further includes: program instructions to run a plurality of active applications on the computing device; program instructions to detect a change in application focus on the computing device; program instructions to assign priorities to at least some of the plurality of active applications, resulting in priority applications having different levels of priority; and program instructions to monitor performance parameters of the priority applications; program instructions to determine that one or more of the monitored performance parameters of the priority applications has fallen below a performance threshold value of an associated key performance indicator (KPI), wherein the determination indicates a degradation in performance of at least one of the priority applications; and program instructions to modify an allocation of shared computing device resources to address the degradation in performance of the at least one of the priority applications. The allocation of resources is modified based on the priority level of the priority applications. Additionally, the program instructions are stored on the computer readable storage medium for execution by the CPU via the computer readable memory.

In aspects, the system may also include program instructions to: detect a subsequent change in application focus on the computing device; program instructions to re-assign priorities to at least some of the plurality of active applications, resulting in newly prioritized applications having different levels of priority; program instructions to monitor performance of the newly prioritized applications; and program instructions to determine that one or more of the monitored performance parameters of the newly prioritized applications has fallen below a performance threshold value of an associated KPI. The determination indicates degradation in performance of at least one of the newly prioritized applications. The system also includes program instructions to modify an allocation of shared computing device resources to address the degradation in performance of the at least one of the newly prioritized applications, wherein the allocation of the shared computing device resources is modified based on the priority level of the newly prioritized applications. Such program instructions enable the system to dynamically prioritize applications based on a user's interaction with the system, to provide for an optimal user experience.

In aspects the system may also include program instructions to: determine that a new application has been downloaded to the computing device or is being opened for the first time; run the new application for a predetermined period of time; measure performance of the new application; determine the baseline performance parameters of the new application based on the measuring; and save the baseline performance parameters. Such program instructions enable the system to set its own threshold values consistent with the type of operating system utilized.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to computer multitasking and, more particularly, to methods and system for addressing application multitasking degradation. In embodiments, a system and method for resolving application multitasking degradation is provided to address the problem of application performance degradation in multitasking systems. In aspects, a multitasking system and method constantly monitors the performance of "in focus" or visible applications to ensure their performance is not degraded by modifying the amount of memory, CPU, storage, or other resource allocated to the "in focus" or visible applications, as necessary. In the context of the present invention, "in focus" means that a window is active and may respond to user selections and key presses on a user input device (e.g., mouse, keyboard, touchscreen, etc.). In the context of the present invention, "visible application" means an application that a user can physically monitor, such as through observing a display, listening to sound output, or feeling haptic feedback, and the like. In aspects, the system and method uses a prioritization of applications, based on the level of visibility to the end user, and dynamically changes application process priority based on the level of visibility.

Aspects of the present invention may provide a technical solution to the technical problem of application lag or slowdown during application multitasking. For example, in embodiments, a system measures baseline response times or key performance indicators (KPIs) for application tasks of each prioritized application on a plurality of devices, and maintains these baseline KPIs by continuously monitoring and adjusting resource allocations and ensuring that the user never experiences a performance lag due to multitasking.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
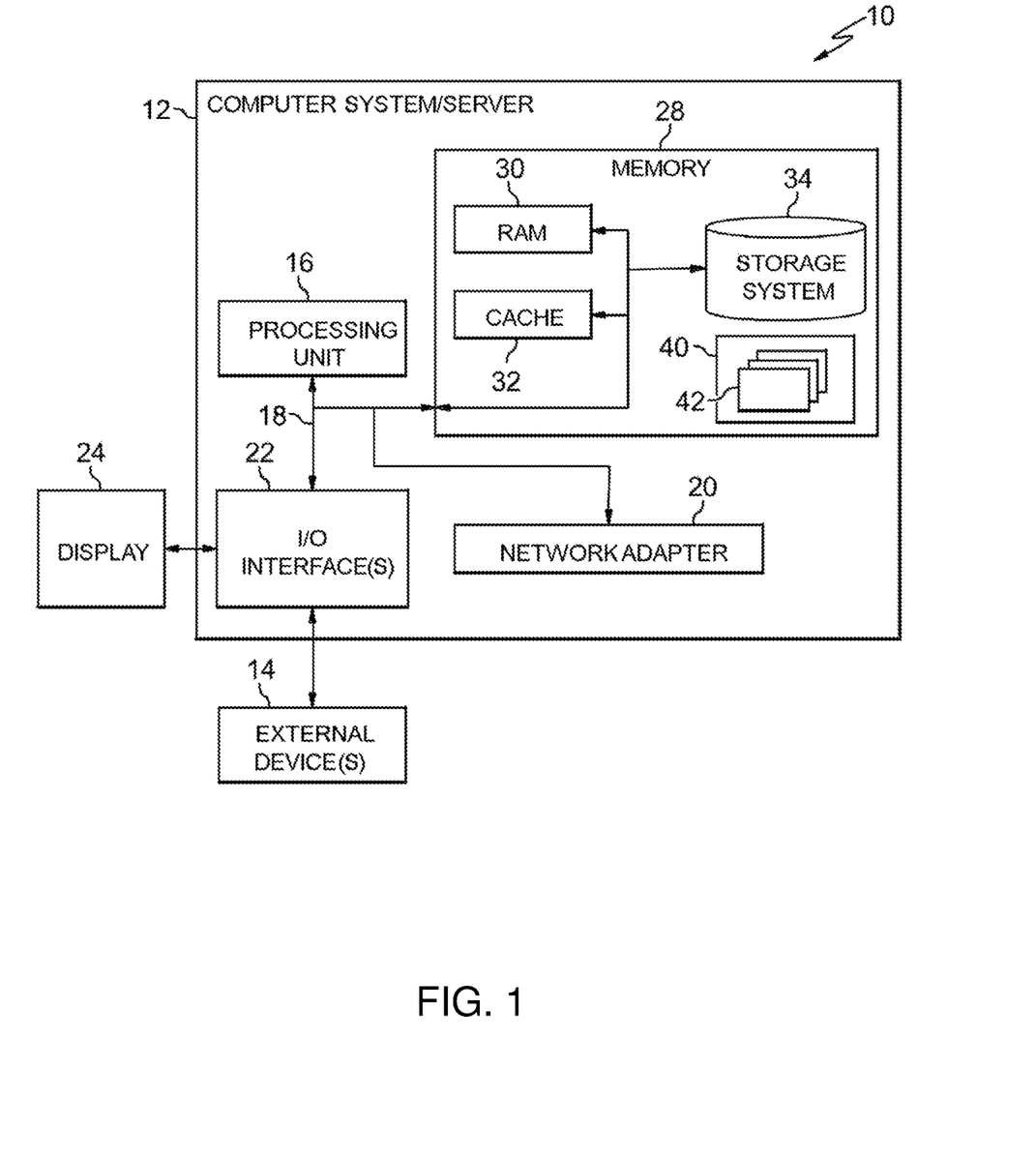
FIG. 1 depicts a computing infrastructure according to an embodiment of the present invention.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
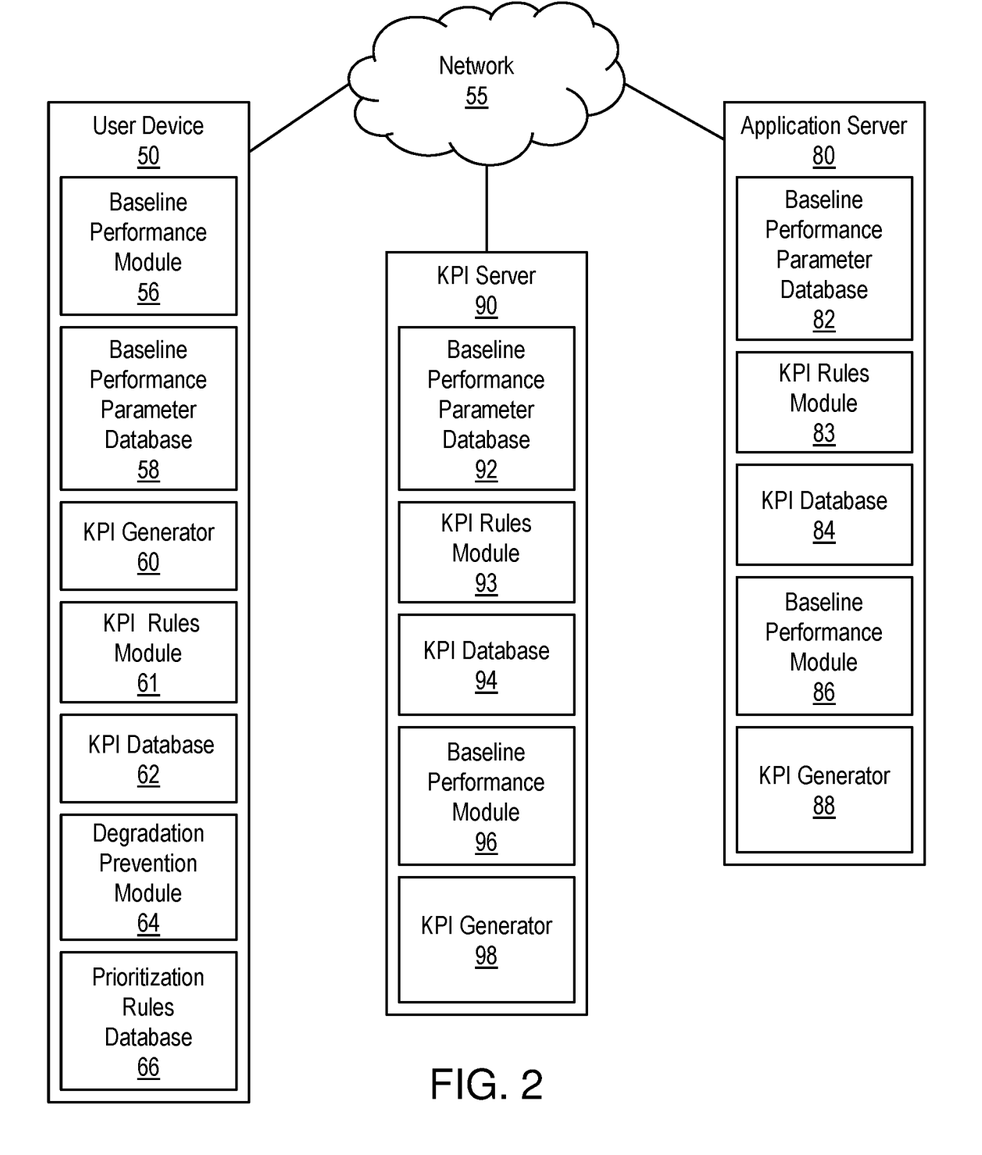
FIG. 2 shows an exemplary environment in accordance with aspects of the invention.

FIG. 2 shows an exemplary environment in accordance with aspects of the invention. The environment includes a user device 50, which may be connected to a network 55. In embodiments, the user device 50 includes a baseline performance module 56 for determining baseline performance parameters of application programs (hereinafter applications) stored in user device 50, and a baseline performance parameter database 58 for storing the baseline performance parameters. The term "baseline performance parameter" in the context of the present invention is intended to mean a baseline numeric or other measurable factor (e.g., execution time in seconds) associated with the performance of one or more tasks or processes of an application (also referred to herein as an application task). In embodiments, a baseline performance parameter is associated with the performance of an application task on a user device (e.g., user device 50) when performed alone, with no other applications running or active on the user device (i.e., no background apps running). Baseline performance parameters may include, for example, the time it takes to open or close emails, the time it takes to create a text message, the time it takes to create a calendar entry, etc.

In embodiments, the user device 50 includes a KPI generator 60 for determining standard KPIs for application tasks based on baseline performance parameters of the application tasks, a KPI rules module 61, and a KPI database 62 for storing the standard KPIs. The term KPI (key performance indicator) in the context of the present invention is intended to mean an acceptable measurable numeric value or range (e.g., an acceptable time period) associated with the performance of an application task. It should be understood that a KPI for a particular application task may be the same as a baseline performance parameter, or may be different from the baseline performance parameter. By way of example, a baseline performance parameter for the task of opening an email may be less than 1 second (<1 sec), and the KPI for the same task may be <1 sec. By way of another example, the baseline performance parameter for the task of opening an email may be <500 milliseconds (ms), while the KPI for the task may be <1 sec. It can be understood that different user's may have different tolerance levels for the time it takes to complete tasks. Accordingly, in embodiments, KPIs may be customized by a user through user device 50.

Still referring to FIG. 2, in embodiments, the user device 50 includes a degradation prevention module 64 for improving a user's experience on the user device 50. The degradation prevention module 64 of the user device 50 is configured to perform one or more of the functions described herein. The degradation prevention module 64 may include one or more program modules (e.g., program module 42 of FIG. 1) executed by the user device 50. In embodiments, the degradation prevention module 64 is configured to prioritize one or more active applications or active application tasks on the user device 50 based on rules in a prioritization rules database 66, monitor application tasks of the one or more prioritized active applications to detect any performance degradation (based on KPIs), and upon the detection of performance degradation, instruct the user device 50 to adjust shared resource allocations to bring the performance parameters (e.g., time needed to complete the task) back into compliance with the associated KPIs (e.g., back within an acceptable time period to complete the task). In context of the present invention, the term "active applications" should be understood to include active foreground applications and background applications, including any active application with user visibility.

The user device 50 may be a general purpose computing device, such as a desktop computer, laptop computer, tablet computer, smartphone, wearable technology, etc. The user device 50 may comprise components of the computer system 12 of FIG. 1, and may be connected to the network 55 via the network adapter 20 of FIG. 1. For example, user device 50 may include an I/O interface 22 enabling a user to access and customize KPIs stored in KPI database 62, and storage system 34 may include databases 58, 62 and 66. In embodiment, the user device 50 may be any type of special purpose computing device that runs multitasking applications and that may benefit from the systems and methods for prioritizing application multitasking in accordance with the present invention.

The network 55 may be any suitable communication network or combination of networks, such as a local area network (LAN), a general wide area network (WAN), and/or a public network (e.g., the Internet). The user device 50 may be connected to an application server 80 via the network 55. In embodiments, the application server 80 is a special purpose computing device for providing applications and associated data to user devices (e.g., the user device 50). The application server 80 may include one or more elements of computer system 12 of FIG. 1. For example, the application server 80 may include one or more program modules (e.g., program module 42 of FIG. 1) executed by the application server 80. In embodiments, the application server 80 is configured to provide one or more applications to the user device 50 via network 55. In embodiments, applications provided to user device 50 are accompanied by baseline performance parameter data and/or KPI data from a baseline performance parameter database 82 or a KPI database 84. In embodiments, the application server 80 includes a baseline performance module 86 for determining baseline parameters of application tasks. In embodiments, the application server 80 includes a KPI generator 88 that utilizes a KPI rules module 83 for determining standard KPIs for the application tasks based on the baseline performance parameters of the application tasks, and a KPI database 84 for storing the generated KPIs.

In embodiments, the user device 50 may be in communication with a KPI server 90 via the network 55. The KPI server 90 is a computing device that includes one or more elements of computer system 12 shown in FIG. 1. In embodiments, the KPI server 90 is a special purpose computing device managed by a third party provider for determining standard KPIs for various applications and distributing the KPIs to user devices (e.g., user device 50). The KPI server 90 may include one or more program modules (e.g., program module 42 of FIG. 1) executed by the KPI server 90. In embodiments, the KPI server 90 is configured to generate standard KPIs for applications and distribute the KPIs to user devices (e.g., the user device 50) for use with user device degradation prevention modules (e.g., module 64). In embodiments, the KPI server 90 includes a baseline performance module 96 for determining baseline parameters of application tasks and saving them in baseline performance parameter database 92. In embodiments, the KPI server 90 includes a KPI generator 98 that utilizes a KPI rules module 93 for determining standard KPIs for the application tasks based on the baseline performance parameters of the application tasks, as will be discussed in more detail below. The standard KPIs generated may be stored in a KPI database 94.

In embodiments, when a new application is first installed on a user device (e.g., user device 50) or used, the system of the present invention determines the time taken by each major application task in an application to execute. This may be a default set of metrics based on the type of device (e.g., type of Operating System (OS)) being used, or may be measured by running the application without any other background applications (non-multitasking) for a period of time. For example, refreshing a web browser on a new smart phone should take no longer than 20 ms and is measured to take 10 ms when no other background applications are running. Once the baseline has been defined (through measurement or defaults), KPIs are then created and monitored. These KPIs represent degradation prevention baselines for the application. Methods of establishing KPIs in accordance with the present invention will now be discussed in more detail with reference to FIG. 3.

Figure 3:
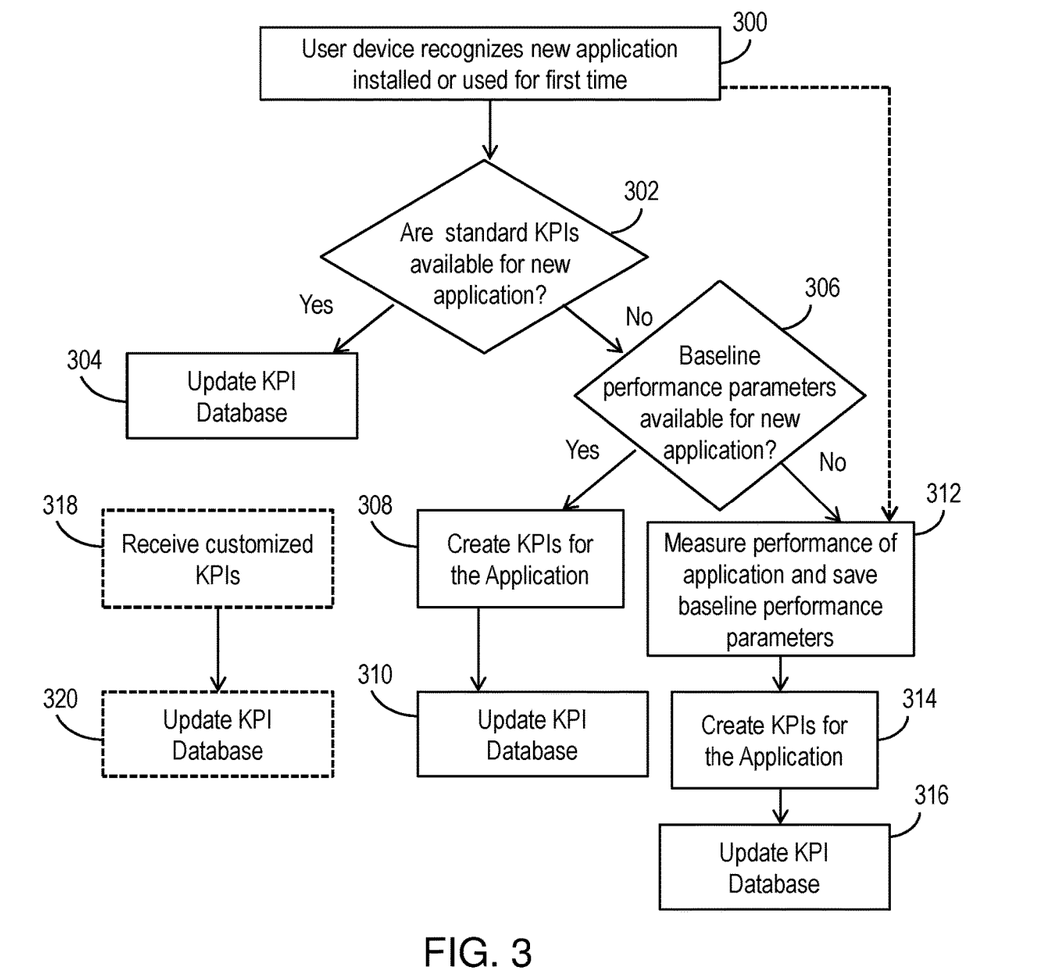
FIG. 3 shows a flowchart of steps of a method in accordance with aspects of the invention.

FIG. 3 shows a flowchart of a method in accordance with aspects of the invention. Steps of the method of FIG. 3 may be performed in the environment illustrated in FIG. 2, and are described with reference to elements shown in FIG. 2.

In step 300, a user device 50 recognizes that an application (hereinafter new application) is newly installed or is being used for the first time.

At step 302, the user device 50 determines if standard KPIs are available for the new application. Step 302 may be performed by the baseline performance module 56. In embodiments, standard KPIs are downloaded with a new application, such as through the download of a new application and associated KPIs from the third party application server 80. In embodiments, standard KPIs associated with a new application are downloaded separately from the new application, such as through the third party KPI server 90. In embodiments, standard KPIs may already be present in the KPI database 62 of the user device 50, such as when a mobile phone is sold with applications having associated standard KPI data already stored therein.

At step 304, if standard KPIs are available for the new application from a remote source (e.g., application server 80 or KPI server 90), the KPI database 62 of the user device 50 is updated to store standard KPIs (standard KPI data) obtained from the remote source. It should be understood that standard KPIs may be specific to a particular operating system on which the new application is running. Table 1 illustrates some examples of KPIs for different devices (BLACKBERRY IS A TRADEMARK OF BlackBerry Limited Corporation. IPHONE is a trademark of Apple Inc.).

TABLE 1

KPIs For Different Devices

| Application | Device | KPI |
| --- | --- | --- |
| Email | BLACKBERRY 500 | Opening an email should take <1 sec |
| Email | BLACKBERRY 900 | Opening an email should take <500 ms |
| Calendar | IPHONE 6s | Creating a calendar entry should take 2 sec |

At step 306, if standard KPIs are not available for the new application, then the user device 50 determines if pre-determined baseline performance parameters (default metrics) are available for the new application. Step 306 may be performed by the baseline performance module 56. In embodiments, baseline performance parameters are downloaded with a new application, such as through the download of a new application and associated baseline performance parameters from the application server 80. In embodiments, baseline performance parameters associated with a new application are downloaded separately from the new application, such as through the KPI server 90. In embodiments, baseline performance parameters may already be present in a baseline performance parameter database 58 of the user device 50, such as when a mobile phone is sold with applications having associated baseline performance parameter data already stored therein.

At step 308, if baseline performance parameters are available for the new application, but standard KPIs are not available, then the user device 50 utilizes KPI generator 60 to create KPIs for the new application based on the available baseline performance parameters. Baseline performance parameters utilized by the KPI generator 60 may be baseline performance parameters stored in baseline performance parameter database 58, or may be baseline performance parameters stored with the new application, for example. In embodiments, the KPI generator 60 utilizes the KPI rules module 61 to determine a desirable performance metric based on the baseline performance parameters. For example, the rules module 61 may include a rule that certain "opening" tasks, such as opening emails, opening calendars, etc., should take no more than 500 ms longer than the baseline performance parameter execution time. In this example, when the execution time for opening an email is 500 ms, the KPI generator 60 would generate a standard KPI for opening an email of <1 sec (baseline performance parameter of 500 ms+500 ms).

At step 310, the KPI database 62 is updated with the KPIs created at step 308.

At step 312, a baseline performance parameter determination step is performed. In embodiments, step 312 is performed if no standard KPIs and pre-determined baseline performance parameters are available for the new application. In embodiments, the user device 50 commences with step 312 immediately after recognizing a new application is installed or used at step 300, skipping steps 302-310. At step 312, the user device 50 runs the new application for a predetermined period of time while measuring performance of associated application tasks and determining baseline performance parameters for the new application based on the measuring. In embodiments, the baseline performance module 56 runs the new application without any other background applications running (i.e., in single application mode), and measures how long it takes to execute each of the application tasks associated with the new application in order to determine the new application's baseline performance parameters. By way of example, a user may be given a predetermined period of time (e.g., 10 minutes) by the baseline performance module 56 to use the new application without any background applications being used. When the baseline performance parameter is "execution time", the baseline performance module 56 measures the time taken to open and close emails, create text messages, or complete other application tasks. The determined baseline performance parameters are then saved in the baseline performance parameter database 58.

At step 314, the KPI generator 60 creates KPIs based on the baseline performance parameters of the new application created at step 312. In embodiments, the KPI generator 60 utilizes the KPI rules module 61 to determine a desirable performance metric based on the baseline performance parameters, in the same manner as describe with respect to step 308.

At step 316, the KPI database 62 is updated with the KPIs created at step 314.

Optionally, at step 318, a user may customize KPIs to optimize the user's experience. By way of example, a standard KPI obtained from a third party or generated by KPI generator 60 may set a desired execution time for opening an email at <1 sec, but a user may not require such a quick response and may customize the KPI for opening an email at <2 sec. Customization at step 318 may be conducted through a user interface on a display 24 of the user device 50, for example. This may comprise presenting a KPI table (not shown) to the user including an application task column and a KPI column listing KPIs associated with the respective application tasks, and enabling the user to edit the KPIs.

It should be understood that third party baseline performance modules, such as baseline performance module 86 of the application server 80 and the baseline performance module 96 of the KPI server 90 may be utilized in the same manner as the baseline performance module 56. Thus, applications can be run by the baseline performance module 86 of the application server 80 to determine baseline performance parameters of the application, and the baseline performance parameters may be stored in the baseline performance parameter database 82. Likewise, applications can be run by the baseline performance module 96 of the KPI server to determine baseline performance parameters of the application, and the baseline performance parameters may be stored in the baseline performance parameter database 92.

It should also be understood that third party KPI generators, such as the KPI generator 88 of the application server 80 and the KPI generator 98 of the KPI server 90, can be utilized in the same manner as the KPI generator 60 to generate general KPIs for applications based on associated baseline performance parameters. Thus, the KPI generator 88 of the application server 80 may obtain baseline performance parameter data from the baseline performance parameter database 82 and generator standard KPIs based on rules from the rules module 83. Likewise, the KPI generator 98 of the KPI server 90 may obtain baseline performance parameter data from the baseline performance parameter database 92 and generator standard KPIs based on rules from the rules module 93.

Once KPIs are established for application tasks of the new application, the degradation prevention module 64 of the present invention may utilize the KPIs to address multitasking degradation. More specifically, once application tasks are prioritized, degradation prevention module 64 monitors the performance of the prioritized applications for degradation in performance (e.g., slow down of task execution) based on the KPIs. If degradation prevention module 64 determines that an application task has fallen below a tolerance threshold value (performance threshold value) set in the associated KPI, the degradation prevention module 64 signals the OS of the user device 50 to increase the priority that the application gets for the device's central processing unit (CPU), associated network, memory, or other resource. The term "fallen below" herein is intended to mean that the performance of the application task is outside of the performance threshold value such that the performance is worse than the desired performance represented by the performance threshold value. In embodiments, a method of the present invention continuously adjusts user device resource allocations to maintain the baseline KPIs. This ensures a user never sees lag due to multitasking. Additional details regarding methods for resolving application degradation in accordance with the present invention are set forth below with respect to FIG. 4.

In embodiments, the system of the present invention may utilize KPI data to optimize a user device experience in either a single interactive application scenario, or a multiple interactive application scenario.

Single Interactive Application Scenario

In the single interactive application scenario, there is only ever one application which a user interacts with at a time on the user device 50 (referred to hereafter as a foreground application). This may occur, for example, in the case of a mobile phone or tablet, where most user interfaces (UIs) prevent a user from viewing or interacting with more than one application at a time. In aspects of the invention, the foreground application will dynamically have the highest priority, and therefore, the multitasking method of the present invention will be applied to it and it alone. Any other application running or active on the user device 50 is considered "background" in this scenario, and therefore will be preempted if the foreground application requires an increased in the allocation of shared resources.

Thus, it can be understood that in the single interactive application scenario, the system of the present invention combats the "slow down" that occurs on most mobile phones over time as users install application they never or infrequently use and forget about. Such applications typically each take up some amount of background processing, even when they are only nominally running. The culmination of these types of applications adds up over time and begins to affect the foreground application.

Multiple Interactive Application Scenario

In the multiple interactive application scenario, a user may interact with multiple active applications at any given time. For example, a user may listen to a music track in the background (using a first application), while playing a game in the foreground (using a second application). In another example, a user of a mobile phone device is on a phone call (using a first application) which is also being recorded in the background (using a second application). In such multiple interactive application scenarios, multiple applications or application tasks may be equally important to the user, and the user may not want to compromise the processing time of any of the multiple interactive applications. In this scenario, the present invention may assign priorities to each of the multiple interactive applications (e.g., visible applications).

As an example of prioritization in a multiple interactive application scenario using the present invention, a top priority (priority 1) may be applied to one or more "foreground applications" that are currently displayed on a user interface (e.g., display 24) of a user device (e.g., user device 50). A lower priority (priority 2) may be applied to one or more other active applications which are currently visible to the user, such as audio for a background music player, a health application currently being used (e.g., activity tracker), or any application that, if degraded, would be visible to the end user. An even lower priority (priority 3) may be given to all other active applications. In embodiments, the system and method of the present invention would be implemented to always give shared resource allocation preference to the priority 1 applications, and to give resource allocation preference to priority 2 applications over priority 3 applications.

Multitasking degradation prevention steps that may be implemented by the present invention will now be discussed in more detail with reference to FIG. 4. Steps of the method of FIG. 4 may be performed in the environment illustrated in FIG. 2, and are described with reference to elements shown in FIG. 2. Steps 400-410 detailed below may be implemented in the context of the single interactive application or the multiple interactive application scenarios discussed above.

At step 400, multiple applications are run on the multitasking user device 50. The multiple applications may include visible and non-visible applications.

At step 402, a change in focus of active applications or application tasks is detected. Step 402 may be implemented by degradation prevention module 64. In context of the present invention, the term "change in focus" is intended to encompass situations wherein an application becomes active or inactive in an existing focus window (foreground application), any application in a focus window is replaced by another application, or one or more new applications with user visibility become active or inactive. By way of example, a user device 50 may detect a change in focus when a user closes a web browser (first application) and opens an email account (second application). Upon detecting this change in focus, degradation prevention module 64 causes application priorities to be calculated or recalculated, as discussed below with respect to step 404. Thus, it can be understood that aspects of the present invention advantageously provide for a user-driven algorithm, rather than a purely mathematical algorithm to address performance lag in multitasking systems. That is, the present invention does not rely on static lists of user processes, but instead dynamically changes priority of applications to ensure a good end user experience.

As previously noted, step 402 may be implemented in the context of the single interactive application or the multiple interactive application scenarios discussed above. For example, detecting a change of application focus in a single interactive application scenario may comprise detecting that a first application in a focus window is closed, and a second application is opened in the focus window. In another example, detecting a change of application focus in a multiple interactive application scenario may comprise detecting that a new application (first application) is opened in a focus window while a music playing application (second application) continues to be active in the background.

At step 404, priorities are assigned to active applications or application tasks utilizing prioritization rules from the prioritization rules database 66, resulting in one or more priority applications or priority application tasks. Step 404 may be implemented by the degradation prevention module 64. By way of example, if a user opens an email client on the user device 50, the degradation prevention module 64 may assign the email application a top priority (e.g., priority 1), may assign a voicemail application a lower priority (e.g., priority 2), and may assign all other applications an even lower priority (e.g., priority 3), based on rules of prioritization stored in database 66. The rules of prioritization stored in database 66 may be standard rules obtained by the user through a third party, may be rules created or customized by the user, or may be a combination thereof. For example, the rules of prioritization stored in database 66 may be in the form of a downloadable standard rules table, which is automatically updated upon downloading a new application (including prioritization rules associated therewith) to the user device 50. By way of another example, the rules of prioritization stored in the database 66 may be in the form of a downloadable and editable rules table, which may be retrieved by the user device 50 from a third party, such as the application server 80. In embodiments, the system of the present invention may exclude certain active applications from being considered during step 404, or may consider all active applications.

At step 406, performance parameters of priority applications or priority application tasks are measured. Step 406 may be implemented by the degradation prevention module 64. In embodiments, degradation prevention module 64 measures performance parameters of only select priority applications or priority application tasks. By way of example, after assigning priority 1 to an email application, priority 2 to a voicemail application, and priority 3 to all other active applications, degradation prevention module 64 may measure the performance of only the priority 1 and priority 2 applications. Thus, unlike other multitasking solutions that require monitoring of all application tasks, aspects of the invention allow for targeted monitoring of tasks visible to the end user. In embodiments, the system of the present invention continuously measures the performance parameters until a change in application focus (step 402 in FIG. 4) is detected, and the system then reevaluates the priority of active applications in accordance with step 404.

At step 408, performance parameters measured at step 404 are monitored for performance degradation (performance lag). More specifically, in aspects, measured performance parameter values from step 404 are compared to KPIs associated with the priority applications at issue to determine if the measured performance parameter value is outside of (has fallen below) an associated performance threshold value defined by the KPIs. It should be understood that the performance threshold value may be a single value or a range. Step 408 may be implemented by the degradation prevention module 64. By way of example, the degradation prevention module 64 may determine that a priority 1 email application is taking >1 sec to open emails, and that the associated KPI for the email opening task is <500 ms. By comparing the measured email performance parameter (email opening time >1 sec) to the email performance threshold value (<500 ms), the degradation prevention module 64 determines the priority 1 email application has fallen below the performance threshold value of the associated KPI, and is experiencing degradation in performance. In embodiments, the system of the present invention continuously monitors the performance parameters until a change in application focus is detected (step 400 in FIG. 4), whereupon the prioritization and degradation prevention method of the present invention starts over at step 404 (see FIG. 4).

At step 410, upon detection of performance degradation at step 408, instructions are sent to the OS to modify shared resource allocations to address the degradation determined at step 408. Step 410 may be implemented by the degradation prevention module 64. In aspects, degradation prevention module 64 determines which back-end OS modification are necessary to bring the performance parameters of the applications or application tasks at issue back to acceptable levels (back into compliance with KPI threshold values), and instructs the OS of the user device 50 to modify shared resource allocations accordingly. A database of OS modification rules (not shown) may be utilized by the degradation prevention module 64 to determine the necessary back-end OS modifications. By way of example, if the degradation prevention module 64 determines that the performance of an email application has degraded below KPI threshold values (e.g., emails are taking >1 sec to open and the KPI threshold is <500 ms), the degradation prevention module 64 may instruct the OS of the user device 50 to change the amount of CPU resources allocated to the email application. Thus, by allocating more CPU processing power to the email application, the performance of the email application can be brought back into compliance with the KPI (e.g., emails will open in <1 sec). In embodiments, the degradation prevention module 64 may instruct the OS of the user device 50 to incrementally change the amount of shared resources allocated to a priority application or application task until the degradation prevention module 64 determines that the priority application or application tasks at issue is in compliance with KPI threshold values. In this way, just enough shared resources are allocated to the priority application or priority application task to meet KPI threshold values, but not so much that competing applications or application tasks are degraded any more than is necessary to meet user expectations.

Figure 4:
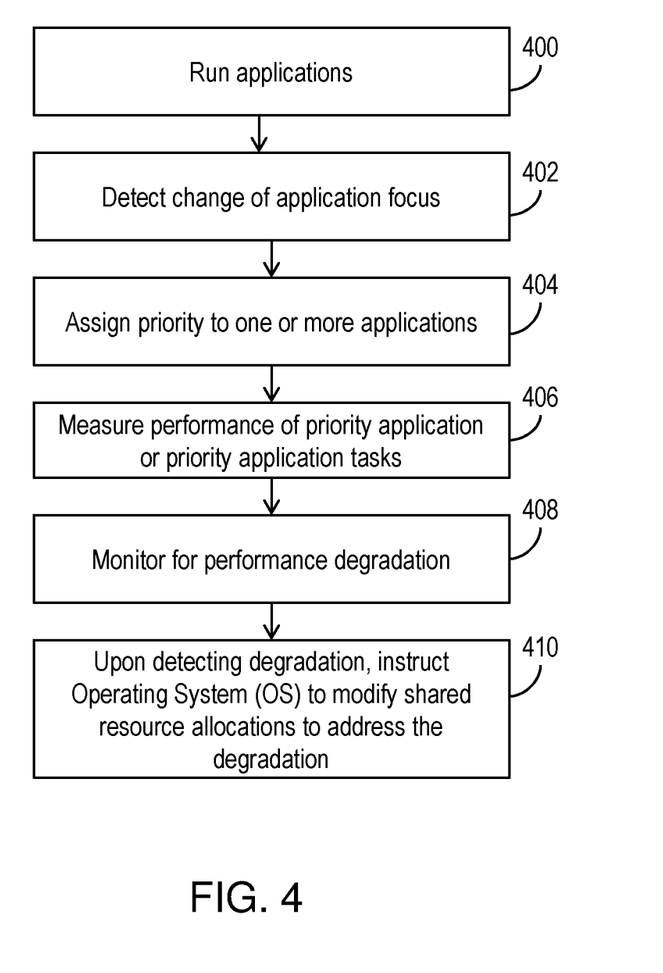
FIG. 4 shows a flowchart of steps of a method in accordance with aspects of the invention.

In aspects of the invention, any time a change of application focus is detected, the method of FIG. 4 restarts at step 404. In aspects of the invention, baseline performance module 56 continuously monitors for any subsequent changes in application focus. Thus, in aspects of the invention, upon detecting a subsequent change in application focus, priorities are re-assigned to at least some of the active applications or active application tasks on the user device 50, performance of the newly prioritized applications or newly prioritized application tasks are monitored to determine if one or more of the performance parameters has fallen below a performance threshold value of an associated KPI, and instructions are sent to the OS to modify an allocation of shared resources to address the degradation in performance of the newly prioritized applications or application tasks.

It should be understood that, prior to implementation of steps 400-410 of the present invention, a default priority setting may be implemented by the user device 50, wherein the priority of select active applications or active application tasks is predetermined according to a set of instructions. For example, the degradation prevention module 64 may instruct a new user device 50 starting for the first time to assign a priority to a welcome screen (welcome app) in the foreground above all other active applications. Once a user begins utilizing the user device 50, changes in application focus will be detected in accordance with step 402, and the prioritization and degradation prevention steps of the present invention will proceed as discussed above.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. For example, a Solution Integrator may utilize KPI server 90 to provide multiple users with KPI data for use with their user device degradation prevention modules (e.g., degradation prevention module 64). In return, the service provider can receive payment from the customer(s) under a subscription and/or fee agreement and/or the service provider can receive payment from the sale of advertising content to one or more third parties.

In still another embodiment, the invention provides a computer-implemented method for use with a user device including a multitasking operating system. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
running, by a computing device, a plurality of active applications;
detecting, by the computing device, a change in application focus by continuously monitoring the computing device for the change in application focus;
assigning, by the computing device, priorities to at least some of the plurality of active applications, resulting in a first priority application and a second priority application having different levels of priority;
monitoring, by the computing device, performance parameters of each of the first priority application and the second priority application;
determining, by the computing device, that one or more of the monitored performance parameters of the first priority application has fallen below a performance threshold value of an associated key performance indicator (KPI), wherein the determination indicates a degradation in performance of the first priority application;
modifying, by the computing device, an allocation of shared computing device resources to address the degradation in performance of the first priority application, wherein the allocation of shared computing device resources is modified based on the priority level of the first priority application;
detecting, by the computing device, a subsequent change in application focus on the computing device;
re-assigning, by the computing device, priorities to at least some of the plurality of active applications, resulting in newly prioritized applications having different levels of priority;
monitoring, by the computing device, performance of the newly prioritized applications;
determining, by the computing device, that one or more of the monitored performance parameters of the newly prioritized applications has fallen below a performance threshold value of an associated KPI, wherein the determination indicates a degradation in performance of at least one of the newly prioritized applications; and
modifying, by the computing device, an allocation of shared computing device resources to address the degradation in performance of the at least one of the newly prioritized applications, wherein the allocation of the shared computing device resources is modified based on a priority level of the newly prioritized applications.

2. The computer-implemented method of claim 1, further comprising:
determining, by the computing device, baseline performance parameters for the plurality of active applications;
creating, by the computing device, the KPIs based on the baseline performance parameters; and
saving, by the computing device, the KPIs in a database.

3. The computer-implemented method of claim 2, wherein the determining the baseline performance parameters comprises:
determining, by the computing device, that a new application has been downloaded to the computing device or is being opened for a first time;
running, by the computing device, the new application for a predetermined period of time;
measuring, by the computing device, performance of the new application;
determining, by the computing device, the baseline performance parameters of the new application based on the measuring; and
saving, by the computing device, the baseline performance parameters.

4. The computer-implemented method of claim 1, further comprising:
obtaining, by the computing device, baseline performance parameters for the first priority application and the second priority application;
creating, by the computing device, the KPIs for one or more applications tasks of the first priority application and the second priority application based on the baseline performance parameters, wherein the KPIs comprise performance threshold values for each of the one or more application tasks; and
saving, by the computing device, the KPIs in a database.

5. The computer-implemented method of claim 1, wherein the first priority application and the second priority application are run in one of:
a multiple interactive application scenario, wherein a user is enabled to interact with both of the first priority application and the second priority application at a same time; and
a single interactive application scenario, wherein a user only interacts with one of the first priority application and the second priority application at a time.

6. The computer-implemented method of claim 1, wherein the assigning priorities comprises:

determining, by the computing device, a visibility of the plurality of active applications on the computing device, including the first priority application and the second priority application;

accessing, by the computing device, a prioritization rules database; and assigning, by the computing device, priorities to less than all of the plurality of active applications on the computing device based on the visibility of the respective application and rules in the rules database.

7. A computer program product comprising a computer readable storage medium having program instructions embodied therewith, the program instructions executable by a computing device to cause the computing device to:

run a plurality of active applications on the computing device;

detect a change in application focus on the computing device by continuously monitoring the computing device for the change in application focus;

assign priorities to at least some of the plurality of active applications, resulting in a first priority application and a second priority application having different levels of priority;

monitor performance parameters of each of the first priority application and the second priority application;

determine that one or more of the monitored performance parameters of the first priority application has fallen below a performance threshold value of an associated key performance indicator (KPI), wherein the determination indicates a degradation in performance of the first priority application; and modify an allocation of shared computing device resources to address the degradation in performance of the first priority application, wherein the allocation of the shared computing device resources is modified based on the priority level of the first priority application, wherein the assigning priorities comprises:

determine a level of visibility of each of the plurality of active applications on the computing device, including the first priority application and the second priority application;

access a prioritization rules database; and assign priorities to less than all of the plurality of active applications on the computing device based on the level of visibility of the respective application and rules in the rules database.

8. The computer program product of claim 7, wherein the program instructions further cause the computing device to:

detect a subsequent change in application focus on the computing device;

re-assign priorities to at least some of the plurality of active applications, resulting in newly prioritized applications having different levels of priority;

monitor performance of the newly prioritized applications;

determine that one or more of the monitored performance parameters of the newly prioritized applications has fallen below a performance threshold value of an associated KPI, wherein the determination indicates a degradation in performance of at least one of the newly prioritized applications; and modify an allocation of shared computing device resources to address the degradation in performance of the at least one of the newly prioritized applications, wherein the allocation of the shared computing device resources is modified based on the priority level of the newly prioritized applications.

9. The computer program product of claim 7, wherein the program instructions further cause the computing device to:

determine baseline performance parameters for the plurality of active applications;

create the KPIs based on the baseline performance parameters; and save the KPIs in a database.

10. The computer program product of claim 9, wherein the program instructions further cause the computing device to:

determine that a new application has been downloaded to the computing device or is being opened for a first time;

run the new application for a predetermined period of time;

measure performance of the new application;

determine the baseline performance parameters of the new application based on the measuring; and save the baseline performance parameters.

11. The computer program product of claim 7, wherein the program instructions further cause the computing device to:

obtain baseline performance parameters for the first priority application and the second priority application;

create the KPIs for one or more applications tasks of the first priority application and the second priority application based on the baseline performance parameters, wherein the KPIs comprise performance threshold values for each of the one or more application tasks; and save the KPIs in a database.

12. The computer program product of claim 7, wherein the first priority application and the second priority application are run in one of:

a multiple interactive application scenario, wherein a user is enabled to interact with both of the first priority application and the second priority application at a same time; and a single interactive application scenario, wherein a user only interacts with one of the first priority application and the second priority application at a time.

13. A system comprising:

a CPU, a computer readable memory and a computer readable storage medium associated with the computing device;

program instructions to run a plurality of active applications on the computing device;

program instructions to detect a change in application focus on the computing device by continuously monitoring the computing device for the change in application focus;

program instructions to assign priorities to at least some of the plurality of active applications, resulting in a first priority application and a second priority application having different levels of priority;

program instructions to monitor performance parameters of each of the first priority application and the second priority application;

program instructions to determine that one or more of the monitored performance parameters of the first priority application has fallen below a performance threshold value of an associated one of key performance indicators (KPIs), wherein the determination indicates a degradation in performance the first priority application;

program instructions to modify an allocation of shared computing device resources to address the degradation in performance of the first priority application, wherein the allocation of the shared computing device resources is modified based on a priority level of the first priority application;

program instructions to detect a subsequent change in application focus on the computing device;
program instructions to re-assign priorities to at least some of the plurality of active applications, resulting in newly prioritized applications having different levels of priority;
program instructions to monitor performance of the newly prioritized applications;
program instructions to determine that one or more of the monitored performance parameters of the newly prioritized applications has fallen below a performance threshold value of an associated KPI, wherein the determination indicates a degradation in performance of at least one of the newly prioritized applications; and
program instructions to modify an allocation of shared computing device resources to address the degradation in performance of the at least one of the newly prioritized applications, wherein the allocation of the shared computing device resources is modified based on a priority level of the newly prioritized applications, and
wherein the program instructions are stored on the computer readable storage medium for execution by the CPU via the computer readable memory.

14. The system of claim 13, further comprising:
program instructions to determine baseline performance parameters for the plurality of active applications;
program instructions to create the KPIs based on the baseline performance parameters; and
program instructions to save the KPIs in a database.

15. The system of claim 14, wherein the program instructions to determine baseline performance parameters comprise program instructions to:
determine that a new application has been downloaded to the computing device or is being opened for a first time;
run the new application for a predetermined period of time;
measure performance of the new application;
determine the baseline performance parameters of the new application based on the measuring; and
save the baseline performance parameters.

16. The system of claim 13, further comprising:
program instructions to obtain baseline performance parameters for the first priority application and the second priority application;
program instructions to create the KPIs for one or more applications tasks of the first priority application and the second priority application based on the baseline performance parameters, wherein the KPIs comprise performance threshold values for each of the one or more application tasks; and
program instructions to save the KPIs in a database.

17. The system of claim 13, wherein the first priority application and the second priority application are run in one of:
a multiple interactive application scenario, wherein a user is enabled to interact with both of the first priority application and the second priority application at a same time; and
a single interactive application scenario, wherein a user only interacts with one of the first priority application and the second priority application at a time.

18. The system of claim 13, wherein the assigning priorities comprises:
program instructions to determine a visibility of the plurality of active applications on the computing device, including the first priority application and the second priority application;
program instructions to access a prioritization rules database; and
program instructions to assign priorities to less than all of the plurality of active applications on the computing device based on the visibility of the respective application and rules in the rules database.

* * * * *